3,069,419
PREGNADIENE ENOL ETHER ORTHOESTERS
John P. Dusza, Nanuet, and Seymour Bernstein, New City, N.Y., assignors to American Cyanamid Company, New York, N.Y., a corporation of Maine
No Drawing. Filed July 7, 1961, Ser. No. 122,411
5 Claims. (Cl. 260—239.55)

This invention relates to steroid enol ethers. More particularly, it relates to a method of preparing enol ether orthoesters of steroids of the pregnane series.

The preparation of 21-mono esters or 16,21-mixed esters of steroids having the $16\alpha,17\alpha,21$-trihydroxy moiety has, in the past, presented a problem. This was because of the fact that any esterification of this type steroid gave primarily $16\alpha,21$-diesterification with small amounts of $16\alpha$-ester and 21-ester. Separation and purification of the 21-mono ester was difficult, costly and time consuming.

We have now found that desirable esters, particularly 21-mono esters and $16\alpha,21$-mixed esters can be prepared readily from enol ether orthoesters which are the subject matter of the present invention. The enol ethers prepared by the process of the present invention can be illustrated by the following formula:

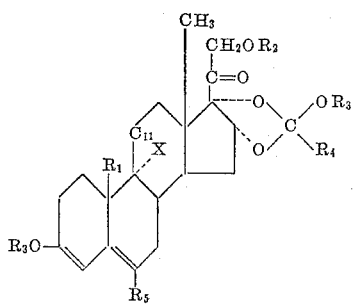

wherein $R_1$ is selected from the group consisting of hydrogen and methyl radicals, $R_2$ is selected from the group consisting of hydrogen and lower alkanoyl radicals, $R_3$ is a lower alkyl radical, $R_4$ and $R_5$ are selected from the group consisting of hydrogen and lower alkyl radicals, $C_{11}$ is a divalent radical selected from the group consisting of

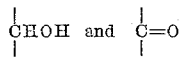

and X is selected from the group consisting of hydrogen and halogen radicals.

The above compounds are produced by a process of reacting steroids having the formula:

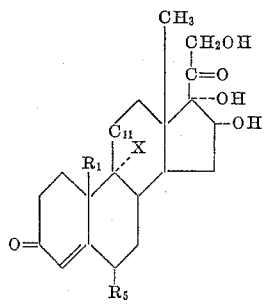

wherein $R_1$, $R_5$, $C_{11}$ and X are as hereinbefore defined with an orthoester of the general formula:

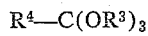

$$R^4\text{—}C(OR^3)_3$$

wherein $R^3$ and $R^4$ are as defined above.

The orthoformates useful in the present process include, for example, trimethylorthoformate, ethylorthoformate, ethyl orthoacetate, methyl orthopropionate, methyl orthoacetate and the like.

The process of the present invention is carried out in a solvent, for example, dioxane or tetrahydrofuran or mixtures of such with methylene chloride, chloroform, etc. to which a small amount of lower alkyl alkanol corresponding to 3-enol ether grouping of the desired steroid is added. The reaction is compete in a matter of minutes after all the reactants are present.

The compounds of the present invention are useful for their anti-inflammatory activity. The process of the present invention is useful in preparing intermediates useful in the preparation of 21-mono esters $16\alpha$-mono esters and 16,21-mixed esters. The preparation of the esters is described and claimed in our copending application Serial No. 122,412, filed July 7, 1961.

The following examples describe in detail the process for preparing steroid enol ethers.

EXAMPLE I $11\beta,21$-Dihydroxy-3-Methoxy-$16\alpha,17\alpha$-Methoxymethylenedioxy-3,5-Pregnadien-20-One One gram of $11\beta,16\alpha,17\alpha$-21-tetrahydroxy-4-pregnene-3,20-dione is suspended in 10 ml. of dioxane, 1.0 ml. of trimethylorthoformate and 4 drops of methanol. Two drops of 70% perchloric acid are added and solution is obtained in one minute and the reaction allowed to proceed for an additional one minute. The reaction is terminated by the addition of 1.0 ml. of pyridine. The entire reaction mixture is poured into water and filtered. After drying there is obtained 1.03 g. of the enol ether orthoester. The infrared spectrum of this material indicates complete conversion to the enol ether. The dried solid is dissolved in methylene chloride and chromatographed on a synthetic magnesium silicate adsorbent (40 g.). The material eluated in the late methylene chloride+2% acetone aliquots (4 x 100 ml.) and the early methylene chloride+4% acetone aliquots (3 x 100 ml.) is combined to give 0.35 g. of enol ether orthoester. An aliquot of the 2% acetone series exhibits a melting point of 176–177° C. after drying under reduced pressure;

$$[\alpha]_D^{25} -18.3°$$

(1% pyridine in chloroform);

$$\lambda_{max.}^{MeOH} 237\ m\mu\ (\epsilon 21,900)$$

EXAMPLE II $9\alpha$-Fluoro-$11\beta,21$-Dihydroxy-3-Methoxy-$16\alpha,17\alpha$-Methoxymethylenedioxy-3,5-Pregnadien-20-One To a suspension of 2.0 g. of $9\alpha$-fluoro-$11\beta,16\alpha,17\alpha,21$-tetrahydroxy-4-pregnene-3,20-dione in 20 ml. of dry dioxane, 2.0 ml. of trimethylorthoformate and 0.1 ml. absolute methanol is added 0.1 ml. of concentrated sulfuric acid. The solution becomes homogeneous in five minutes and the reaction time is extended another fifteen minutes by which time the solution has become quite dark red. The reaction is terminated by the addition of 1.2 ml. of pyridine which dissipates most of the color. The light yellow reaction mixture is poured into water and filtered to give 2.2 g. of the crude enol ether orthoester. The crude material is dissolved in methylene chloride and chromatographed on a synthetic magnesium silicate adsorbent. The desired material is eluted with the latter methylene chloride+2% acetone aliquots (5 x 100 ml.) and the methylene chloride+4% acetone aliquots (18 x 100 ml.) to give a total of 1.011 g. of crystalline material. A combination of the 2% acetone aliquots provided 0.7 g. of product which when dried under reduced pressure exhibits a melting point of 197–206° C.; $[\alpha]_D^{25} \pm 0°$ C. (1% pyridine in chloroform);

$$\lambda_{max.}^{MeOH} 240\ m\mu\ (\epsilon 20,600)$$

EXAMPLE III

*21-Acetoxy-11β-Hydroxy-3-Methoxy-16α,17α-Methoxy-methylenedioxy-3,5-Pregnadien-20-One*

A solution of 1.05 g. of 11β,21-dihydroxy-3-methoxy-16α,17α-methoxymethylenedioxy - 3,5 - pregnadien-20-one in 5.0 ml. of pyridine is treated with 3.0 ml. of acetic anhydride. After standing overnight at room temperature the reaction mixture is poured into water and extracted with ether. The ether extracted is washed with a saturated saline solution and dried. Evaporation of the solvent gives a semi-crystalline residue which is taken up in methylene chloride and chromatographed on a synthetic magnesium silicate adsorbent (30 g.). The early methylene chloride aliquots (25 ml.) are combined to give 0.29 g. of desired material. After drying under reduced pressure a melting point of 194–196° C. is observed; $[\alpha]_D^{25} -16.5°$ (1% pyridine in chloroform);

$$\lambda_{max.}^{MeOH} \ 238 \ m\mu \ (\epsilon 20,200)$$

EXAMPLE IV

*21-Acetoxy-9α-Fluoro-11β-Hydroxy-3-Methoxy-16α,17α-Methoxymethylenedioxy-3,5-Pregnadien-20-One*

A solution of 1.96 g. of 9α-fluoro-11β,21-dihydroxy-3-methoxy-16α,17α-methoxymethylenedioxy - 3,5 - pregnadien-20-one in 15 ml. of dry pyridine and 10 ml. of acetic anhydride is allowed to stand at room temperature for 20 hours. The reaction mixture is poured into water and extracted thoroughly with ether. The ether layer is washed with a saturated saline solution and dried over sodium sulfate. Evaporation of the solvent gives a glass which is taken up in methylene chloride and chromatographed on a synthetic magnesium silicate adsorbent (60 g.). The desired material is eluted in the methylene chloride aliquots (10 x 100 ml.) and amounted to 1.1 g. of crystalline 21-acetate. A portion of this material (0.3 g.) is rechromatographed to yield 0.075 g.; melting point 176–194° C.; $[\alpha]_D^{25} +2°$ (1% pyridine in chloroform);

$$\lambda_{max.}^{MeOH} \ 240 \ m\mu \ (\epsilon 18,300)$$

We claim:
1. Compounds of the formula:

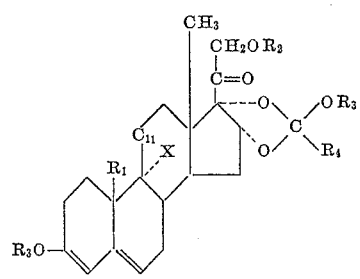

wherein $R_1$ is selected from the group consisting of hydrogen and methyl radicals, $R_2$ is selected from the group consisting of hydrogen and lower alkanoyl radicals, $R_3$ is a lower alkyl radicals, $R_4$ is selected from the group consisting of hydrogen and lower alkyl radicals, $C_{11}$ is a divalent radical selected from the group consisting of

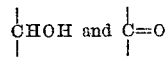

and X is selected from the group consisting of hydrogen and halogen radicals.

2. The compound 11β,21-dihydroxy-3-methoxy-16α,17α-methoxymethylenedioxy-3,5-pregnadien-20-one.

3. The compound 9α-fluoro-11β,21 - dihydroxy - 3-methoxy-16α,17α - methoxymethylenedioxy - 3,5 - pregnadien-20-one.

4. The compound 21-acetoxy-11β-hydroxy-3-methoxy-16α,17α-methoxymethylenedioxy-3,5-pregnadien-20-one.

5. The compound 21-acetoxy-9α-fluoro-11β-hydroxy-3-methoxy-16α,17α - methoxymethylenedioxy - 3,5 - pregnadien-20-one.

References Cited in the file of this patent

UNITED STATES PATENTS

| | | |
|---|---|---|
| 2,966,486 | Smith et al. | Dec. 27, 1960 |
| 2,985,652 | Ringold et al. | May 23, 1961 |